Figure 1:
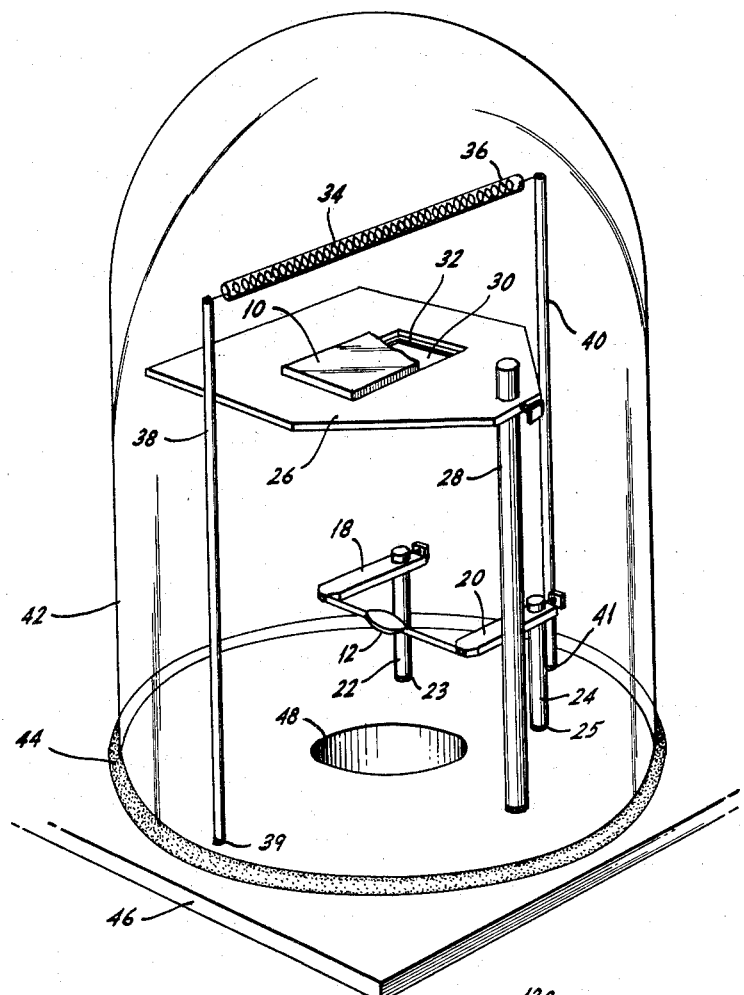

March 31, 1964   L. W. HERSHINGER   3,127,282
PROCESS FOR MAKING PHOSPHOR LAYERS
Filed April 25, 1961

INVENTOR.
LINCOLN W. HERSHINGER
BY
Herbert Epstein
AGENT

United States Patent Office 3,127,282
Patented Mar. 31, 1964

3,127,282
PROCESS FOR MAKING PHOSPHOR LAYERS
Lincoln W. Hershinger, Oreland, Pa., assignor, by mesne assignments, to Philco Corporation, Philadelphia, Pa., a corporation of Delaware
Filed Apr. 25, 1961, Ser. No. 105,325
12 Claims. (Cl. 117—33.5)

This invention relates to a process for making phosphor layers and phosphor crystals of the type comprising zinc, cadmium and at least one of the substances sulfur, selenium and tellurium.

A thin phosphor film evaporated onto a substrate is composed of extremely small phosphor crystals, closely packed against one another, has very smooth surfaces and is conductive. Because the phosphor film has this structure, it would appear to be useful as the image screen of a high-resolution cathode-ray tube or in a device in which some or all of the phosphor layer is to be quenched by application of a direct voltage. Such a device is described in my copending patent application Serial No. 97,298, filed March 21, 1961.

However phosphor films made by prior-art processes often have been unsatisfactory for these uses because of their inefficient response to excitation. In this regard many prior-art phosphor films emit, in response to impingement by a cathode-ray beam of given intensity, only a small fraction of the light which would be emitted by a settled screen in response to the same beam. In addition many prior-art films are not excited appreciably by ultraviolet radiation to emit visible light. This makes them useless in devices employing electroquenching because in such devices it is important that the phosphor layer respond efficiently to ultraviolet excitation.

Accordingly an object of the invention is to provide a method for producing a phosphor film.

Another object is to provide a method for producing a phosphor film capable of producing high-resolution images.

Another object is to provide a method for producing a phosphor film efficiently excitable by either ultraviolet radiation or cathode-rays.

Another object is to provide a process for producing opaque phosphor films having a light output in response to ultraviolet or cathode-ray excitation comparable to that of settled screens.

Another object is to provide a process for producing translucent phosphor films having a light output in response to ultraviolet or cathode-ray excitation which is much greater than that of prior-art translucent phosphor films.

Another object is to provide a process for producing phosphor films of a type which is particularly suitable for use in devices employing electroquenching.

Another object is to provide a process for producing a phosphor layer efficiently excitable by ultraviolet radiation or cathode-rays and having a substantial electrical conductivity.

Another object is to provide a process for producing phosphor crystals.

Phosphor films according to the invention are produced by depositing onto a substrate a layer of a compound composed of one of the metals zinc and cadmium and at least one substance selected from the group consisting of sulfur, selenium and tellurium, and heating this layer in an atmosphere comprising a halide of the other metal. Typically the compound deposited is a sulfide, selenide or telluride of said one metal. It may also be a sulfoselenide, a sulfotelluride, a selenotelluride or a sulfoselenotelluride. Preferably the halide of the other metal is a chloride, bromide or fluoride. The atmosphere may contain more than one halide of said other metal, and may also contain one or more halides of said one metal.

In a preferred embodiment of the invention a layer of cadmium sulfide is evaporated onto the substrate. Then the layer and substrate are heated in an atmosphere containing zinc chloride and oxygen for a time sufficient to convert the cadmium sulfide film into a mixed zinc-cadmium sulfide phosphor. The latter film is found to be highly responsive to either ultraviolet radiation or cathode rays to emit visible light. It is also characterized by surface smoothness and good electrical conductivity and hence is particularly well adapted for use in electroquenchable devices.

The invention also includes making phosphor crystals by heating crystals of a compound containing one of the metals cadmium and zinc and one or more of the substances, sulfur, selenium and tellurium in an atmosphere comprising a halide of the other metal.

Figure 2:
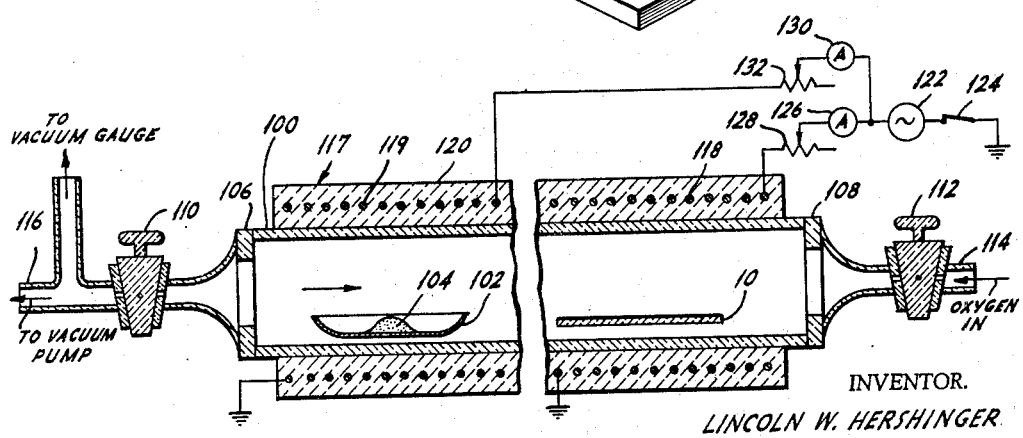

The invention will be described in greater detail with reference to the appended drawings forming part of the specification in which:

FIGURES 1 and 2 are diagrams of apparatus employed in practicing a preferred embodiment of the invention.

Prior to practicing the process of the invention, the surface of a substrate 10 upon which the phosphor layer is to be formed is cleansed. Typically substrate 10 is a glass plate, e.g. the faceplate of a cathode ray tube or of a device employing electroquenching. The softening temperature of this substrate is above the temperatures employed in practicing the process. However because these processing temperatures are relatively low, the substrate may be composed of glass rather than such temperature-resistant materials as fused quartz. The latter material often must be used when certain prior-art techniques employing higher temperatures are used to form the phosphor film on the substrate.

Substrate 10 can be cleansed by employing any one of a number of conventional techniques—e.g., by cleansing the surface with a chromic acid solution and rinsing it with distilled water. I prefer to cleanse the surface of the substrate on which the phosphor film is to be formed by smearing a paste of the cleansing agent Bon Ami over it, allowing the paste to dry to a powder, and wiping the powder from the surface with clean paper tissue. To remove any remaining Bon Ami the cleansed surface then is brushed with a camel's hair brush or with an anti-static brush of the type commonly used to remove dust from phonograph records.

If the substrate is part of a device employing electroquenching, a transparent, conductive film is deposited at this time on the cleansed surface. Typically this conductive layer consists of a mixed tin-indium oxide. A method suitable for depositing such a conductive layer is described in my patent application Serial No. 97,298, filed March 21, 1961. If the substrate is the faceplate of a cathode ray tube, it is unnecessary to deposit such a conductive film.

The phosphor film then is formed either on the conductive film (if such has been deposited on the substrate) or on the cleansed substrate surface (if no conductive film has been deposited thereon) by practicing the process of the invention. An embodiment of this process has already been described but not claimed in my copending application Serial No. 97,298, filed March 21, 1961.

To facilitate description of the process, the apparatus of FIGURE 1 used in practicing it is first described. This figure illustrates the apparatus used for evaporating a film of cadmium sulfide onto the substrate. The apparatus comprises a boat 12 for containing the cadmium sulfide to be evaporated. Boat 12 typically is made of thin molybdenum, e.g. 5 mil sheet metal, and has a substantial resistance between its ends. It is supported by members 18 and 20 between a pair of massive, low-resistance standards 22 and 24 through which an electric current can be supplied thereto. Members 22 and 24 are mounted on electrically insulating bushings 23 and 25 respectively.

A substrate holder 26 is supported by a post 28 above boat 12. Holder 26 has an aperture 30 through which a surface of the substrate can be exposed to cadmium sulfide evaporated from boat 12 and comprises a flange 32 to support the substrate. A heating coil 34 enclosed in a quartz tube 36 is supported between metal posts 38 and 40 through which an electric current can be supplied thereto. Post 38 and 40 are mounted on electrically insulating bushings 39 and 41. Coil 34 serves to heat the substrate.

The foregoing assembly is enclosed in a bell jar 42 resting on a gasket 44 on a table 46. A duct 48 in table 46 communicates with the input of a vacuum pump (not shown).

In practicing the process, substrate 10 is placed in substrate holder 26 with the surface of substrate 10 on which the phosphor layer is to be formed facing boat 12. An appropriate quantity of cadmium sulfide crystals is placed within boat 12. Bell jar 42 is fitted over the apparatus against gasket 44 and the vacuum pump connected to duct 48 is set into operation. The pressure within bell jar 42 is reduced to 0.05 micron of mercury or less. Then an electric current is passed through coil 34 of sufficient intensity to heat and maintain substrate 10 at a temperature of about 150° C. When substrate 10 has attained this temperature, the cadmium sulfide in boat 12 is heated to a temperature of about 800° C. by passing an electric current of appropriate intensity through boat 12. Under these conditions cadmium sulfide is evaporated from boat 12 and condenses on the surface of substrate 10 facing the boat. This condensation is continued for about one hour and typically deposits a film of cadmium sulfide which is about one micron thick. The thickness of the film is measurable during evaporation by employing conventional interferometric techniques. The film so deposited has an extremely fine grain structure.

The cadmium sulfide film so deposited ordinarily does not produce visible light in response to excitation. In accordance with the invention the film is rendered efficiently emissive of visible light in response to cathode ray or ultraviolet excitation by heating substrate 10 at a moderate temperature, e.g. 475° C., in an atmosphere comprising zinc chloride. To carry out this step substrate 10 is placed within a quartz combustion tube 100 with its filmed surface oriented upwardly. In addition a refractory dish 102 containing an appropriate quantity 104 of highly purified zinc chloride also is placed in tube 100 relatively close to substrate 10. The ends of the combustion tube then are closed by members 106 and 108. Stopcocks 110 and 112 are opened and the interior of combustion tube 100 is flushed with oxygen supplied by way of tubing 114. Then stopcock 112 is closed and a vacuum pump (not shown) connected to tubing 116 is set into operation. When the pressure within combustion tube 100 has been reduced to about 5 millimeters of mercury, stopcock 110 also is closed. Then combustion tube 100 is inserted into a furnace 117 two laterally-displaced zones of which are already heated to the required temperatures, i.e. about 375° C. in the zone to be occupied by dish 102 and about 475° C. in the zone to be occupied by substrate 10. To heat these zones to two different temperatures, furnace 117 comprises two laterally-displaced heating coils 118 and 119 embedded in a refractory casing 120. Both coils are energized by a source of alternating current 122 having one terminal thereof connected to both coils by a switch 124. The other terminal of source 122 is connected to coil 118 by way of an ammeter 126 and a current-adjusting rheostat 128, and is connected to coil 119 by way of an ammeter 130 and a current-adjusting rheostat 132. The current supplied to coil 118 is of such intensity as to heat the zone of the furnace surrounded thereby to about 475° C. and the current supplied to coil 119 is of such intensity as to heat the zone of the furnace surrounded thereby to 375° C. This heating is continued for about 150 minutes. Under these conditions, the zinc chloride 104 in dish 102 melts and evaporates at a substantial rate. The zinc chloride vapor interacts with the cadmium sulfide film to convert it into a film comprising zinc cadmium sulfide. During this conversion the color of the film gradually changes from the dark reddish brown characteristic of heated cadmium sulfide to the off-white characteristic of heated zinc sulfide.

After the heating step is ended, substate 10 is permitted to cool. Then the phosphor film thereon is washed by agitating the substrate in distilled water for a few seconds, and is dried in air. The phosphor film so prepared emits visible light in response to either ultraviolet radiation or cathode-ray excitation with an efficiency similar to that of a settled phosphor excited in the same manner. Typically the light emitted is yellow or red-orange. The film is translucent and has a smooth surface to which intimate electrical connection can be made readily, e.g. by evaporating metal thereonto. In addition the film is electrically conductive. Accordingly it is suitable for use as a screen in a cathode-ray tube as well as in a device employing electroquenching.

The process of the invention is not limited to the preferred embodiment just described; on the contrary many other embodiments are feasible. For example, substrate 10 need not be heated during the deposition of cadmium sulfide thereon. On the contrary the substrate may initially be at room temperature, undergoing heating only to the extent that the cadmium sulfide vapor condensing thereon heats it. However, heating the substrate by coil 34 is preferred because such heating helps bond the condensing cadmium sulfide film tenaciously to the substrate.

In addition it is only necessary to evacuate the region within bell jar 42 to a pressure of 0.05 micron of mercury or less in those cases in which the film must not contain such structural imperfections as would short-circuit electrical connections made to opposing surfaces of the film, e.g. in devices employing electroquenching. In those applications in which no electrical connections are made to opposing surfaces of the phosphor and in which such short-circuiting defects are unimportant, e.g. in cathode-ray tube screens, the pressure within bell jar 42 may be as high as 10 microns of mercury without deleteriously affecting the image resolution obtainable from the phosphor film.

Boat 12 may be heated to temperatures higher than 800° C., e.g. as high as 1000° C., to speed up the deposition of the cadmium sulfide film. Such a high temperature is entirely satisfactory for the deposition of a cathode ray tube screen. It may be unsatisfactory for the deposition of a phosphor layer for a device employing electroquenching because the rapid rate of evaporation and condensation produced by the higher temperature may produce short-circuiting defects in the resultant phosphor layer. Temperatures lower than 800° C. also can be used to deposit the cadmium sulfide layer. The only disadvantage of such lower temperatures is that a longer time is required to deposit a given thickness of cadmium sulfide onto the substrate.

In the foregoing example, the condensation of cadmium sulfide was continued for about one hour. The resultant film was so thin as to be translucent. Where a more opaque film with greater light-emissive efficiency is desired, the condensation time is lengthened so as to deposit a thicker film of cadmium sulfide.

In the specific example given above, the cadmium sulfide film was converted into a luminescent film by heating it in an atmosphere containing zinc chloride. However the converting atmosphere alternatively may contain one or more of the other zinc halides either alone or mixed with zinc chloride. For example zinc fluoride or zinc bromide or both can be used in this manner. Indeed phosphor films having higher luminances than films produced by heating cadmium sulfide films in an atmosphere containing only zinc chloride can be formed by heating cadmium sulfide films in an atmosphere containing both zinc chloride and zinc fluoride. Such an atmosphere is produced by placing in dish 102 a mixture of zinc chloride and zinc fluoride, establishing an oxygen pressure of 5 millimeters in tube 100 and heating dish 102 to 375° C. This halide mixture may consist of equal parts by mass of the two salts, or it may contain a predominant mass of zinc chloride. When the mixture is heated to a temperature of 375° C. the zinc chloride melts and the zinc fluoride dissolves thereinto. Both substances then evaporate from the solution to provide the converting atmosphere. This embodiment is most useful in making cathode-ray tube screens. It is not ordinarily used for converting cadmium sulfide layers deposited on transparent conductive films (e.g. tin-indium oxide films) because the fluoride attacks such films.

The permissible initial oxygen pressure within combustion tube 100 is not limited to 5 millimeters of mercury; on the contrary, oxygen pressures as high as atmospheric and as low as 100 microns of mercury have been employed successfully. Increasing the oxygen pressure above 15 millimeters appears to increase the light-producing efficiency of the phosphor film but also increases slightly the grain size of the screen and renders it somewhat more opaque. Decreasing the oxygen pressure below 5 millimeters produces a more transparent phosphor but slightly reduces its light output.

The atmosphere within combustion tube 100 need not comprise oxygen. For example, it may consist essentially of the appropriate halide or halides and an inert gas such as helium or argon. Alternatively it may consist substantially only of the appropriate halide. In such a case tube 100 would be evacuated before its insertion into furnace 117. Also the atmosphere need not comprise only oxygen. For example the atmosphere may consist of air and the appropriate halide or halides. Moreover the halide atmosphere need not be created by heating the halide in a container positioned near the substrate. For example it can also be supplied by flowing over the filmed substrate surface a gas comprising the appropriate halide, e.g. a mixture of argon, oxygen and the vapor of the appropriate halide or halides.

The processing temperatures employed within combustion tube 100 are not critical. Thus the temperature to which the zinc chloride is heated need only exceed the melting point of this substance (about 290° C.). Furthermore the temperature to which the zinc chloride is heated may be substantially higher than the 375° C. employed in the preferred embodiment, e.g. temperatures between 375° C. and the boiling point of zinc chloride (732° C.). The substrate need not be heated to precisely 475° C., but may be heated to temperatures as low as 350° C. When the substrate temperature is lowered, the heating must be continued for a longer time in order to convert the cadmium sulfide layer to an efficient phosphor layer. Alternatively the substrate may be heated to a temperature above 475° C., e.g. to a temperature just below the softening temperature of the glass substrate.

The substance used for conversion is not limited to zinc halides. Although it must include a zinc halide when the film to be converted is composed of cadmium sulfide, the converting substance may comprise in addition a halide of cadmium.

The film evaporated onto the substrate need not be composed of cadmium sulfide. Alternatively it may be composed of zinc sulfide and may be applied to the substrate by the evaporation technique described above. When the evaporated film is composed of zinc sulfide, this film is converted to a phosphor film by heating it in an atmosphere containing a cadmium halide, e.g. cadmium chloride, cadmium bromide, cadmium fluoride or a combination of these halides. It may be a mixture of cadmium and zinc halides. Ordinarily a cadmium sulfide film is evaporated onto the substrate when the color to be emitted by the completed film lies nearer the blue end of the visible spectrum, e.g. yellow or green, and a zinc sulfide film is evaporated onto the substrate when the color to be emitted lies nearer the red end of the spectrum. This is so because continued heating of a cadmium sulfide film in a zinc chloride atmosphere progressively shifts the color emitted by the completed phosphor film from the red end of the spectrum toward the blue end of the spectrum whereas continued heating of a zinc sulfide film in a cadmium chloride atmosphere progressively shifts the color emitted by the completed phosphor film from the blue end of the spectrum toward the red end of the spectrum, and because the efficiency with which the completed phosphor film emits light is increased by lengthening the heating time.

The color emitted by the phosphor film also can be controlled by applying conventional dopants thereto in conventional manner during the formation of the film. For example, after a cadmium sulfide film has been evaporated onto a substrate and before this film is made phosphorescent by heating it in an atmosphere of zinc halide, a small amount of copper or sliver can be evaporated onto the film in conventional manner while the substrate is maintained in a vacuum of 0.1 micron of mercury or less. Then the doped cadmium sulfide film is heated in a zinc halide-containing atmosphere as described above. It is found that copper doping shifts the color emitted toward the red, whereas silver doping shifts the color emitted toward the blue. If desired the film can be doped after conversion. However doping prior to conversion is preferred because the dopant is more easily incorporated into the crystals constituting the film.

The finest grained films are obtained by evaporating the initial sulfide layer onto the substrate. However phosphor layers emitting light efficiently in response to excitation by ultraviolet light and exhibiting good electroquenching properties also may be fabricated by a process according to the invention in which the sulfide layer is settled onto the substrate instead of being evaporated thereonto. Such settling may be performed in conventional manner by employing one of the processes used in fabricating conventional cathode-ray tube screens. For example, the sulfide layer (consisting of either cadmium sulfide or zinc sulfide) may be settled onto a substrate through a column of aqueous potassium silicate. Then the settled sulfide layer is heated in an atmosphere comprising the halide, e.g. chloride, of the metal (zinc or cadmium) not present in the sulfide layer. To obtain a screen with good conductivity and to smooth the surface thereof, the heating is conducted at a temperature which is sufficiently high to sinter the sulfide particles to one another, e.g. 600° C. The heating time typically is between about 5 and 45 minutes. As in the previous embodiment the color emitted by the completed phosphor layer is determined by the relative amounts of zinc and cadmium in the phosphor layer.

The method of the invention is not limited to making phosphor layers, but is also applicable to making phosphor crystals. In such an embodiment of the invention, the sulfide or either zinc or cadmium is heated in an atmosphere containing the chloride of the other metal. This heating is continued for a time depending on the emission color desired from the phosphor.

In the foregoing discussion the substance which is heated in the halide atmosphere to produce a phosphor or phosphor layer has been described as a sulfide of zinc or cadmium. However this substance also may be a selenide, telluride, sulfoselenide, sulfotelluride, selenotelluride or sulfoseleno-telluride of zinc or cadmium.

While I have described my invention in particular embodiments I do not wish to be limited thereto, because obvious modifications will occur to those skilled in the art without departing from the scope of my invention.

What I claim is:

1. A process for producing on a stubstrate a phosphor film characterized by efficient light emission in response to incident ultraviolet radiation, said film comprising a substance selected from the class consisting of the sulfide, selenide, telluride, sulfoselenide, sulfotelluride, selenotelluride and sulfoselenotelluride of both zinc and cadmium, said process comprising the steps of depositing on said substrate a layer composed of a compound containing only one of the two metals zinc and cadmium, selected from the class consisting of the sulfide, selenide, telluride, sulfoselenide, sulfotelluride, selenotelluride and sulfoselenotelluride of said one metal, and thereafter heating said layer in an atmosphere consisting essentially of (1) at least one halide of the other of said two metals zinc and cadmium and (2) at least one material selected from the group consisting of air, oxygen, an inert gas and at least one halide of said one metal, said heating being continued until said layer is activated by interaction with said atmosphere to produce efficient light emission in response to incident ultraviolet radiation.

2. A process according to claim 1, wherein said halides in said atmosphere are selected from the group consisting of chloride, bromide and fluoride and said inert gas is argon.

3. A process according to claim 1, wherein said depositon step comprises evaporating onto said substrate said layer of said compound.

4. A process according to claim 1, wherein said material in said atmosphere is oxygen.

5. A process according to claim 1, wherein said compound of said one metal is a sulfide, said halides in said atmosphere are selected from the group consisting of chloride, bromide and fluoride and said inert gas is argon.

6. A process according to claim 5, wherein said deposition step comprises evaporating onto said substrate said layer of said sulfide compound.

7. A process according to claim 6, wherein a dopant is applied to said sulfide layer.

8. A process according to claim 6, wherein a dopant is applied to said sulfide layer prior to said heating of said layer in said atmosphere.

9. A process according to claim 6, wherein a dopant selected from the group consisting of copper and silver is evaporated onto said sulfide layer prior to said heating of said layer in said atmosphere.

10. A process according to claim 6, wherein said one metal is zinc and said other metal is cadmium.

11. A process according to claim 6, wherein said one metal is cadmium and said other metal is zinc.

12. A process for producing on a substrate a phosphor film comprising zinc cadmium sulfide, characterized by efficient light emission in response to incident ultraviolet radiation, comprising the steps of evaporating onto said substrate a layer consisting essentially of the sulfide of only one of the two metals zinc and cadmium, and thereafter heating said layer in an atmosphere consisting essentially of oxygen and the chloride of the other of said two metals until said layer is activated by interaction with said atmosphere to produce efficient light emission in response to incident ultraviolet radiation.

References Cited in the file of this patent

UNITED STATES PATENTS

| 2,402,759 | Leverenz | June 25, 1946 |
| 2,685,530 | Cusano et al. | Aug. 3, 1954 |
| 2,810,087 | Forque | Oct. 15, 1957 |
| 2,936,252 | Hanlet | May 10, 1960 |
| 2,967,111 | Coghill et al. | Jan. 3, 1961 |

FOREIGN PATENTS

| 851,076 | Great Britain | Oct. 12, 1960 |